US008999280B2

(12) United States Patent
Kato et al.

(10) Patent No.: US 8,999,280 B2
(45) Date of Patent: Apr. 7, 2015

(54) CARBON CATALYST FOR DECOMPOSITION OF HAZARDOUS SUBSTANCE, HAZARDOUS-SUBSTANCE-DECOMPOSING MATERIAL, AND METHOD FOR DECOMPOSITION OF HAZARDOUS SUBSTANCE

(75) Inventors: Yasuharu Kato, Itano-gun (JP); Yuji Kubota, Chiba (JP); Shinichi Horiguchi, Tokyo (JP); Emiko Maeba, Chiryu (JP); Mami Iizuka, Chiba (JP)

(73) Assignee: Nisshinbo Holdings Inc., Tokyo (JP)

( * ) Notice: Subject to any disclaimer, the term of this patent is extended or adjusted under 35 U.S.C. 154(b) by 311 days.

(21) Appl. No.: 13/511,047

(22) PCT Filed: Oct. 1, 2010

(86) PCT No.: PCT/JP2010/067238
§ 371 (c)(1),
(2), (4) Date: May 21, 2012

(87) PCT Pub. No.: WO2011/065125
PCT Pub. Date: Jun. 13, 2011

(65) Prior Publication Data
US 2012/0289755 A1 Nov. 15, 2012

(30) Foreign Application Priority Data

Nov. 26, 2009 (JP) ................................. 2009-269315
Apr. 15, 2010 (JP) ................................. 2010-094510

(51) Int. Cl.
| | |
|---|---|
| *B01D 53/81* | (2006.01) |
| *B01J 23/75* | (2006.01) |
| *B01D 53/86* | (2006.01) |
| *B01J 20/02* | (2006.01) |
| *B01J 20/06* | (2006.01) |
| *B01J 20/08* | (2006.01) |
| *B01J 20/20* | (2006.01) |
| *B01J 20/28* | (2006.01) |
| *B01J 20/32* | (2006.01) |
| *B01J 21/18* | (2006.01) |

(Continued)

(52) U.S. Cl.
CPC ............. *B01J 23/75* (2013.01); *B01D 53/8612* (2013.01); *B01D 53/8668* (2013.01); *B01D 2255/1026* (2013.01); *B01D 2255/2063* (2013.01); *B01D 2255/2065* (2013.01); *B01D 2255/20707* (2013.01); *B01D 2255/20715* (2013.01); *B01D 2255/2073* (2013.01); *B01D 2255/20738* (2013.01); *B01D 2255/20746* (2013.01); *B01D 2255/20753* (2013.01); *B01D 2255/20761* (2013.01); *B01D 2255/20769* (2013.01); *B01D 2255/20784* (2013.01); *B01D 2255/20792* (2013.01); *B01D 2255/702* (2013.01); *B01D 2257/304* (2013.01); *B01D 2257/306* (2013.01); *B01D 2257/406* (2013.01); *B01D 2257/7027* (2013.01); *B01D 2257/704* (2013.01); *B01D 2257/708* (2013.01); *B01D 2257/90* (2013.01); *B01D 2258/0208* (2013.01); *B01D 2258/06* (2013.01); *B01D 2259/4508* (2013.01); *B01D 2259/4566* (2013.01); *B01J 20/0225* (2013.01); *B01J 20/0229* (2013.01); *B01J 20/06* (2013.01); *B01J 20/08* (2013.01); *B01J 20/20* (2013.01); *B01J 20/28007* (2013.01); *B01J 20/2803* (2013.01); *B01J 20/3234* (2013.01); *B01J 21/18* (2013.01); *B01J 37/0018* (2013.01); *B01J 37/0036* (2013.01); *B01J 37/0201* (2013.01); *B01J 37/0203* (2013.01); *B01J 37/06* (2013.01); *B01J 37/086* (2013.01); *B82Y 30/00* (2013.01)

(58) Field of Classification Search
CPC .......... B01D 53/44; B01J 21/18; C01B 31/00
USPC ................... 502/417; 423/210, 244.06, 245.3
See application file for complete search history.

(56) References Cited

U.S. PATENT DOCUMENTS

| | | | | |
|---|---|---|---|---|
| 4,242,226 | A | 12/1980 | Siren | |
| 8,381,738 | B2 * | 2/2013 | Luan et al. | ................... 131/207 |
| 2010/0323272 | A1 | 12/2010 | Ozaki et al. | |

FOREIGN PATENT DOCUMENTS

| | | |
|---|---|---|
| CN | 1098326 A | 2/1995 |
| CN | 1386722 A | 12/2002 |

(Continued)

OTHER PUBLICATIONS

Li et al., "Research Progress on Carbon-based Catalyst for Treating H2S," *Environmental Protection of Oil & Gas Fields*, Sep. 30, 2009, pp. 5-8, vol. 19, No. 3 (with abstract).
Nov. 27, 2013 Office Action issued in Chinese Patent Application No. 201080053511.X (with translation).
Sep. 18, 2012 Japanese Office Action issued in Japanese Patent Application No. 2011-543158.
Dec. 28, 2010 International Search Report issued in International Patent Application No. PCT/JP2010/067238 (with translation).
Mar. 28, 2012 International Preliminary Report on Patentability issued in International Patent Application No. PCT/JP2010/067238 (with translation).
Dec. 28, 2010 Written Opinion of the International Searching Authority issued in International Patent Application No. PCT/JP2010/067238.

(Continued)

Primary Examiner — Stuart Hendrickson
(74) Attorney, Agent, or Firm — Oliff PLC (57) ABSTRACT

Provided are a carbon catalyst for decomposing a hazardous substance that effectively decomposes hazardous substances such as aldehydes, a hazardous-substance-decomposing material, and a method of decomposing a hazardous substance. The carbon catalyst for decomposing a hazardous substance is a carbon catalyst having a catalytic activity for decomposing the hazardous substance. The hazardous substance is, for example, a volatile organic compound such as aldehydes or a malodorous substance such as a sulfur compound. The method of decomposing a hazardous substance, is a method including decomposing the hazardous substance with the carbon catalyst for decomposing a hazardous substance or with a hazardous-substance-decomposing material containing the carbon catalyst for decomposing a hazardous substance.

14 Claims, 4 Drawing Sheets

(51) Int. Cl.
*B01J 37/00* (2006.01)
*B01J 37/06* (2006.01)
*B01J 37/08* (2006.01)
*B82Y 30/00* (2011.01)
*B01J 37/02* (2006.01)

(56) References Cited

FOREIGN PATENT DOCUMENTS

| CN | 1505592 A | 6/2004 |
|---|---|---|
| CN | 1867404 A | 11/2006 |
| CN | 1907847 A | 2/2007 |
| CN | 1315570 C | 5/2007 |
| JP | A-3-196838 | 8/1991 |
| JP | A-11-347409 | 12/1999 |
| JP | A-2000-63295 | 2/2000 |
| JP | A-2008-55425 | 3/2008 |
| WO | WO 02/48032 A2 | 6/2002 |
| WO | WO 03/068387 A1 | 8/2003 |
| WO | WO 2009/098812 A1 | 8/2009 |

OTHER PUBLICATIONS

Jul. 31, 2014 Extended European Search Report issued in European Patent Application No. 10832972.3.
Maria da Conceicao et al. "Catalytic activity of active carbons impregnated before activation of pinewood sawdust and nutshells to be used on the control of atmospheric emissions", Journal of Hazardous Materials B 119 (2005) 135-143.
Chi-Yuan Lu et al. "Catalytic treating of gas pollutants over cobalt catalyst supported on porous carbons derived from rice husk and carbon nanotube", Applied Catalysis B: Environmental 90 (2009) 652-661.
May 14, 2014 Office Action issued in Chinese Application No. 201080053511.X (with translation).
Sep. 9, 2014 Office Action issued in Chinese Patent Application No. 201080053511.X (with translation).
Zhang, Jiadai, "Fundamentals of Carbon Materials Engineering," Apr. 30, 1992, pp. 133-135 (with concise explanation of relevance).

* cited by examiner

FIG.1

| MATERIAL | HCHO CONCENTRATION (ppm) | CO$_2$ CONCENTRATION (ppm) | HCHO DECOMPOSITION RATIO (%) | HCHO DISAPPEARANCE RATIO (%) | HCHO ADSORPTION RATIO (%) |
|---|---|---|---|---|---|
| CARBON CATALYST 1 (PCo) | 0 | 1000 | 100 | 100 | 0 |
| CARBON CATALYST 2 (PCoAW) | 80 | 850 | 85 | 92 | 7 |
| CARBON CATALYST 3 (PCoFeAW) | 40 | 950 | 95 | 96 | 1 |
| CARBON CATALYST 4 (CFCo) | 130 | 750 | 75 | 87 | 12 |
| CARBON CATALYST 5 (AGBCo) | 0 | 1000 | 100 | 100 | 0 |
| CARBON CATALYST 6 (AASCo) | 0 | 1000 | 100 | 100 | 0 |
| ALUMINA/ CARBON CATALYST (A/PCo) | 0 | 1000 | 100 | 100 | 0 |
| COMPARATIVE MATERIAL 1 (AC) | 100 | N.D. | 0 | 90 | 90 |
| COMPARATIVE MATERIAL 2 (CoO) | 900 | N.D. | 0 | 10 | 10 |

FIG. 2

| MATERIAL | NUMBER OF REPETITIONS | HCHO CONCENTRATION (ppm) | $CO_2$ CONCENTRATION (ppm) | HCHO DECOMPOSITION RATIO (%) | HCHO DISAPPEARANCE RATIO (%) | HCHO ADSORPTION RATIO (%) |
|---|---|---|---|---|---|---|
| CARBON CATALYST 1 (PCo) | 1 | 0 | 1000 | 100 | 100 | 0 |
| | 2 | 10 | 990 | 99 | 99 | 0 |
| | 3 | 50 | 910 | 91 | 95 | 4 |
| | 4 | 0 | 1000 | 100 | 100 | 0 |
| | 5 | 0 | 1000 | 100 | 100 | 0 |
| | 15 | 5 | 995 | 99.5 | 99.5 | 0 |
| | 30 | 5 | 995 | 99.5 | 99.5 | 0 |
| COMPARATIVE MATERIAL 1 (AC) | 1 | 100 | N.D. | 0 | 90 | 90 |
| | 2 | 900 | N.D. | 0 | 10 | 10 |

| MATERIAL | NUMBER OF REPETITIONS | $H_2S$ CONCENTRATION (ppm) | $H_2S$ DISAPPEARANCE RATIO (%) |
|---|---|---|---|
| CARBON CATALYST 1 (PCo) | 1 | 0 | 100 |
| | 2 | 0 | 100 |
| | 3 | 0 | 100 |
| | 4 | 0 | 100 |
| | 5 | 0 | 100 |
| | 20 | 0 | 100 |
| COMPARATIVE MATERIAL 1 (AC) | 1 | 50 | 90 |
| | 2 | 300 | 40 |
| | 3 | 450 | 10 | ature
CARBON CATALYST FOR DECOMPOSITION OF HAZARDOUS SUBSTANCE, HAZARDOUS-SUBSTANCE-DECOMPOSING MATERIAL, AND METHOD FOR DECOMPOSITION OF HAZARDOUS SUBSTANCE

TECHNICAL FIELD

The present invention relates to a carbon catalyst for decomposing a hazardous substance, a hazardous-substance-decomposing material, and a method of decomposing a hazardous substance, in particular, a carbon catalyst for decomposing a hazardous substance such as an aldehyde.

BACKGROUND ART

A method involving using a noble metal catalyst such as platinum, a method involving using activated carbon with its specific surface area increased by an activating treatment, or a method involving using a photocatalyst has been conventionally available as a method of removing an aldehyde. Specifically, for example, Patent Document 1 describes a method of decomposing and removing aldehydes with activated carbon carrying platinum.

PRIOR ART DOCUMENT

Patent Document

[Patent Document 1] JP 2008-55425 A

DISCLOSURE OF THE INVENTION

Problems to be Solved by the Invention

However, the noble metal catalyst is not always preferred as a general-purpose catalyst because a noble metal such as platinum is expensive and is limited in terms of its reserves. The use of the activated carbon having a large specific surface area inevitably leads to an onerous operation because the activating treatment is needed. In addition, since activated carbon removes aldehydes through adsorption, when the activated carbon is repeatedly used, a treatment for regenerating the activated carbon is needed. The photocatalyst involves such a limitation that the photocatalyst does not function in an environment where no light source exists.

The present invention has been made in view of these problems, and an object of the present invention is to provide a carbon catalyst for decomposing a hazardous substance that effectively decomposes hazardous substances such as aldehydes, a hazardous-substance-decomposing material, and a method of decomposing a hazardous substance.

Means for Solving the Problems

A carbon catalyst for decomposing a hazardous substance according to an embodiment of the present invention for solving the problems is characterized by having a catalytic activity for decomposing the hazardous substance. According to the present invention, there is provided a carbon catalyst for decomposing a hazardous substance that effectively decomposes hazardous substances such as aldehydes.

Further, the hazardous substance may be a malodorous substance. Further, the hazardous substance may be a volatile organic compound. Specifically, the volatile organic compound may be aldehydes and oxides thereof. Further, the malodorous substance may be a sulfur compound.

Further, the carbon catalyst for decomposing a hazardous substance may be a carbon catalyst obtained by carbonization of a raw material containing an organic substance and a metal. In this case, the raw material may further contain a carbon material. Further, in any such case, the metal may be a transition metal.

A hazardous-substance-decomposing material according to the embodiment of the present invention for solving the problems is characterized by including any one of the carbon catalysts for decomposing a hazardous substance. According to the present invention, there is provided a hazardous-substance-decomposing material that effectively decomposes hazardous substances such as aldehydes.

A method of decomposing a hazardous substance according to the embodiment of the present invention for solving the problems is characterized by including decomposing the hazardous substance with any one of the carbon catalysts for decomposing a hazardous substance or with the hazardous-substance-decomposing material. According to the present invention, there is provided a method of decomposing a hazardous substance by which hazardous substances such as aldehydes are effectively decomposed.

Effect of the Invention

According to the present invention, there are provided a carbon catalyst for decomposing a hazardous substance that effectively decomposes hazardous substances such as aldehydes, a hazardous-substance-decomposing material, and a method of decomposing a hazardous substance.

MODE FOR CARRYING OUT THE INVENTION

Hereinafter, an embodiment of the present invention is described. It should be noted that the present invention is not limited to an example shown in the embodiment.

A carbon catalyst for decomposing a hazardous substance according to this embodiment (hereinafter referred to as "the Catalyst") is a carbon catalyst having a catalytic activity for decomposing the hazardous substance. That is, the Catalyst is constituted of a carbonized material and the carbonized material itself exhibits the catalytic activity for decomposing the hazardous substance. The hazardous substance to be decomposed by the Catalyst may be a gas, or may be dissolved in water or any other solvent.

An example of the hazardous substance to be decomposed by the Catalyst is a malodorous substance. Examples of the malodorous substance include: sulfur compounds each giving off a rotten egg odor; amines, carboxylic acids, and aldehydes each giving off a body odor or a fecal odor; alcohols each giving off a fermentation odor; and ketones, esters, and aromatic hydrocarbons in coating materials and the like. Specific examples of the malodorous substance include one or two or more kinds selected from the group consisting of: sulfur compounds such as hydrogen sulfide, methyl sulfide, methyl disulfide, methylmercaptan, and ethylmercaptan; ammonia; amines such as trimethylamine; carboxylic acids such as propionic acid, n-butyric acid, n-valeric acid, and isovaleric acid; aldehydes such as formaldehyde, acetaldehyde, propionaldehyde, n-butyraldehyde, isobutyraldehyde, n-valeraldehyde, and isovaleraldehyde; alcohols such as isobutanol; ketones such as methyl ethyl ketone and methyl isobutyl ketone; esters such as ethyl acetate; aromatic hydrocarbons such as toluene, styrene, and xylene; and ozone.

Another example of the hazardous substance to be decomposed by the Catalyst is a volatile organic compound (VOC). Examples of the VOC include one or two or more kinds selected from the group consisting of: aldehydes such as formaldehyde, acetaldehyde, nonenal, and acrolein; carboxylic acids such as formic acid, acetic acid, isovaleric acid, butyric acid, and (meth)acrylic acid; alcohols such as ethanol, 1-propanol, 2-propanol, and 1-butanol; ketones such as acetone, methyl ethyl ketone, diethyl ketone, methyl isobutyl ketone, and butyl ethyl ketone; esters such as ethyl acetate, butyl acetate, methyl (meth)acrylate, ethyl (meth)acrylate, methyl formate, dibutyl phthalate, di-2-ethylhexyl phthalate, and fenobucarb; aromatic hydrocarbons such as toluene, xylene, phenol, styrene, benzene, ethylbenzene, benzoic acid, limonene, and cumene; aliphatic hydrocarbons such as methane, ethane, propane, hexane, pentane, tetradecane, cyclohexane, cyclopentanone, and ethylcyclohexane; heterocycles such as indole; ammonia; amines such as trimethylamine, triethylamine, ethylenediamine, pyridine, cyclohexylamine, and N-methyl-2-pyrrolidone; phosphorus compounds such as chlorpyrifos and diazinon; and chlorine compounds such as carbon tetrachloride, chloromethane, chloroform, chloroethylene, and p-dichlorobenzene.

That is, the Catalyst is a carbon catalyst having a catalytic activity for decomposing, for example, aldehydes and oxides thereof. More specifically, the Catalyst is a carbon catalyst having a catalytic activity for decomposing, for example, one or two or more kinds selected from the group consisting of formaldehyde, acetaldehyde, formic acid, and acetic acid.

In addition, the Catalyst is also a carbon catalyst having a catalytic activity for decomposing, for example, sulfur compounds. More specifically, the Catalyst is a carbon catalyst having a catalytic activity for decomposing, for example, one or two or more kinds selected from the group consisting of hydrogen sulfide, methylmercaptan, ethylmercaptan, methyl sulfide, and methyl disulfide.

It should be noted that the Catalyst may be a carbon catalyst substantially free of adsorbing hazardous substances such as aldehydes. That is, the Catalyst performs purification through the decomposition of the hazardous substances such as an aldehyde instead of removing the substances through adsorption. The Catalyst is, for example, a carbon catalyst that has a catalytic activity for decomposing the hazardous substances such as aldehydes and is substantially free of adsorbing the hazardous substances such as aldehydes. As the Catalyst as described above has a catalytic activity for decomposing the hazardous substances such as an aldehyde, the Catalyst is free of breakthrough due to adsorption and does not cause such a problem that an adsorbed substance is released again.

In addition, the Catalyst may decompose a hazardous substance even under an environment having a relatively low temperature. That is, the Catalyst may decompose hazardous substances such as aldehydes at, for example, 0° C. or more. More specifically, for example, the temperature at which the Catalyst decomposes a hazardous substance may be 0° C. or more and 300° C. or less, may be 0° C. or more and 100° C. or less, or may be 0° C. or more and 40° C. or less.

The Catalyst may be a carbon catalyst obtained by the carbonization of a raw material containing an organic substance and a metal. The organic substance is not particularly limited as long as the organic substance is carbonized (is used as a carbon source), and one or two or more kinds of arbitrary substances may be used.

That is, for example, one or both of a high-molecular weight organic compound (e.g., a resin such as a thermoplastic resin or a thermosetting resin) and a low-molecular weight organic compound may be used as the organic substance. A biomass such as a green waste may also be used.

For example, an organic substance containing nitrogen may be preferably used as the organic substance. The organic substance containing nitrogen is not particularly limited as long as the substance contains an organic compound containing a nitrogen atom in a molecule thereof, and one or two or more kinds of arbitrary substances may be used.

For example, a ligand that coordinates to a metal may be preferably used as the organic substance. That is, in this case, an organic compound containing one or more ligand atoms in a molecule thereof is used. More specifically, for example, an organic compound containing, as a ligand atom, one or two or more kinds selected from the group consisting of a nitrogen atom, a phosphorus atom, an oxygen atom, and a sulfur atom in a molecule thereof may be used. For example, an organic compound containing, as a ligand group, one or two or more kinds selected from the group consisting of an amino group, a phosphino group, a carboxyl group, and a thiol group in a molecule thereof may also be used.

Specifically, as the organic compound, there may be used, for example, one or two or more kinds selected from the group consisting of pyrrole, vinylpyridine, imidazole, 2-methylimidazole, aniline, polysulfone, polyaminobismaleimide, polyimide, polyvinyl alcohol, polybenzimidazole, polyamide, polyether, polyether ether ketone, cellulose, lignin, chitin, chitosan, silk, wool, polyamino acid, a nucleic acid, DNA, RNA, hydrazine, hydrazide, urea, an ionomer, polyacrylic acid, polyacrylate, polymethacrylate, polymethacrylic acid, a phenolic resin, a melamine resin, an epoxy resin, a furan resin, a polyamide-imide resin, and polyacrylonitrile.

In addition, for example, one or two or more kinds selected from the group consisting of food industrial waste such as coffee grounds, used tea leaves, brewer's spent grains, and rice bran, wooden wastes such as forest land remainder material and building waste, and domestic waste such as sewage sludge may be used as the biomass such as a waste.

The organic substance may further contain, for example, one or two or more kinds selected from the group consisting of boron, phosphorus, oxygen, and sulfur as a component for improving the activity of the Catalyst.

The metal in the raw material is not particularly limited as long as the metal does not inhibit the activity of the Catalyst, and one or two or more kinds of arbitrary metals may be used. The metal may be, for example, one or two or more kinds selected from the group consisting of Groups 3 to 16 of the periodic table. That is, there may be used one or two or more kinds selected from the group consisting of elements belonging to Group 3A (Group 3), elements belonging to Group 4A (Group 4), elements belonging to Group 5A (Group 5), elements belonging to Group 6A (Group 6), elements belonging to Group 7A (Group 7), elements belonging to Group 8 (Group 8, Group 9, and Group 10), elements belonging to Group 18 (Group 11), elements belonging to Group 28 (Group 12), elements belonging to Group 3B (Group 13), elements belonging to Group 4B (Group 14), elements belonging to Group 5B (Group 15), and elements belonging to Group 6B (Group 16) of the periodic table.

For example, a transition metal (belonging to Groups 3 to 12 of the periodic table) may be preferably used as the metal. Further, a metal belonging to the fourth period of Groups 3 to 12 of the periodic table may be preferably used as the transition metal.

Specifically, for example, there may be preferably used one or two or more kinds selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), paradium (Pd), lanthanoids (such as cerium (Ce)), and actinoids, and there may be more preferably used one or two or more kinds selected from the group consisting of manganese, iron, cobalt, nickel, and copper.

The metal may be used as a simple substance of the metal or as a compound of the metal. As the metal compound, there may be used, for example, a metal salt, a metal oxide, a metal hydroxide, a metal nitride, a metal sulfide, a metal carbide, or a metal complex. Of those, a metal salt, a metal oxide, a metal sulfide, or a metal complex may be preferably used. It should be noted that when a ligand is used as the organic compound described above, a metal complex is formed in a raw material.

In addition, the raw material for the Catalyst may further contain a carbon material. That is, in this case, the Catalyst is a carbon catalyst obtained by the carbonization of the raw material containing the organic substance, the metal, and the carbon material.

The carbon material in the raw material is not particularly limited as long as the entirety or part of the material has been carbonized, and one or two or more kinds of arbitrary materials may be used. That is, for example, a carbon material, which is obtained by the carbonization of an organic compound or a biomass such as waste at a predetermined temperature and does not have any catalytic activity by itself, or a natural mineral, may be used as the carbon material.

Specifically, there may be used, for example, one or two or more kinds selected from the group consisting of lignite, peat, pea coal, graphite, coke, activated carbon, carbon black, a carbon nanotube, a carbon nanohorn, a carbon fiber, and a carbon fibril.

The carbonization of the raw material, which contains at least such organic substance and metal as described above, is performed by heating the raw material and maintaining the raw material at such a predetermined temperature that the raw material is carbonized (carbonization temperature). The carbonization temperature is not particularly limited as long as the raw material is carbonized at the temperature, and for example, the temperature may be 300° C. or more. More specifically, for example, the carbonization temperature may be 300° C. or more and 1,500° C. or less, may be preferably 400° C. or more and 1,200° C. or less, and may be more preferably 500° C. or more and 1,100° C. or less.

A rate of temperature increase upon heating of the raw material to the carbonization temperature is not particularly limited and may be, for example, 0.5° C./min or more and 300° C./min or less. The time period for which the raw material is held at the carbonization temperature (carbonization time) is not particularly limited as long as the raw material is carbonized within the time period, and for example, the carbonization time may be 5 minutes or more. More specifically, for example, the carbonization time may be 5 minutes or more and 240 minutes or less, and may be preferably 20 minutes or more and 180 minutes or less. In addition, the carbonization is preferably performed in an inert gas such as nitrogen (e.g., in a flow of the inert gas).

The Catalyst may be obtained as a carbonized material produced by such carbonization of the raw material. The Catalyst may also be a pulverized product of the carbonized material. A method of pulverizing the carbonized material is not particularly limited, and for example, a pulverizing apparatus such as a ball mill or a bead mill may be used. For example, the average particle diameter of the Catalyst after the pulverization may be 1,000 μm or less, may be preferably 150 μm or less, and may be more preferably 45 μm or less.

The Catalyst may also be such that nitrogen atoms are introduced (doped) into the carbonized material obtained by the carbonization of the raw material. For example, a vapor phase doping method such as an ammoxidation method or a CVD method, a liquid phase doping method, or a vapor phase-liquid phase doping method may be employed as a method of introducing nitrogen atoms. Specifically, for example, nitrogen atoms may be introduced into the surface of the carbonized material by: mixing a nitrogen source such as ammonia, melamine, or acetonitrile with the carbonized material; and holding the resultant mixture under the atmosphere of an inert gas such as nitrogen, argon, or helium at a temperature of 550° C. or more and 1,200° C. or less for a time period of 5 minutes or more and 180 minutes or less. In addition, the resultant carbonized material may be subjected to an activating treatment such as steam activation, carbon dioxide activation, phosphoric acid activation, alkali activation, hydrogen activation, ammonia activation, activation with nitrogen oxide, or electrolytic activation and/or liquid phase oxidation such as nitric acid oxidation, mixed acid oxidation, or hydrogen peroxide oxidation.

The Catalyst may also be a carbon catalyst obtained by subjecting the carbonized material of the raw material containing the organic substance and the metal to a metal removal treatment. That is, in this case, the Catalyst is obtained by subjecting the carbonized material, which is obtained by carbonizing the raw material containing the organic substance and the metal, to the metal removal treatment.

The metal removal treatment is a treatment for removing the metal in the carbonized material obtained by the carbonization of the raw material. The metal removal treatment is not particularly limited as long as the metal in the carbonized material is removed or the amount of the metal is reduced by the treatment, and for example, a cleaning treatment with an acid, an electrolytic treatment, or electrodialysis may be performed.

The acid to be used in the acid treatment is not particularly limited as long as an effect of the metal removal treatment is obtained, and one or two or more kinds of arbitrary acids may be used. That is, for example, one or two or more kinds selected from the group consisting of hydrochloric acid (such as concentrated hydrochloric acid), nitric acid (such as concentrated nitric acid), and sulfuric acid (such as concentrated sulfuric acid) may be used. When two or more kinds of acids are used, for example, a mixed acid prepared by mixing concentrated hydrochloric acid and concentrated nitric acid at a predetermined volume ratio (such as aqua regia), or a mixed acid prepared by mixing concentrated nitric acid and concentrated sulfuric acid at a predetermined volume ratio may be used.

For example, a method involving immersing and holding the carbonized material in a solution containing an acid may be employed as a method for the acid treatment. In this case, the carbonized material may also be held in the boiling acid solution.

The Catalyst may also be a carbon catalyst obtained by subjecting the carbonized material of the raw material containing the organic substance and the metal to a metal removal treatment and a heat treatment. Alternatively, the Catalyst may be a carbon catalyst obtained by subjecting the carbonized material of the raw material containing the organic substance and the metal to an acid treatment and the heat treatment. That is, in any such case, the Catalyst is obtained by: subjecting the carbonized material, which is obtained by carbonizing the raw material containing the organic substance and the metal, to the metal removal treatment (such as an acid treatment); and subjecting the resultant to the heat treatment.

The heat treatment is performed by maintaining the carbonized material subjected to the metal removal treatment as described above at a predetermined temperature (heat treatment temperature). For example, the heat treatment temperature may be 300° C. or more, or may be 400° C. or more. More specifically, for example, the heat treatment temperature may be 300° C. or more and 1,500° C. or less, may be preferably 400° C. or more and 1,400° C. or less, and may be more preferably 500° C. or more and 1,300° C. or less.

The heat treatment temperature may be the same temperature as the carbonization temperature, or may be a temperature different from the carbonization temperature. That is, for example, the heat treatment temperature may be a temperature equal to or lower than the carbonization temperature, or may be a temperature lower than the carbonization temperature. Alternatively, the heat treatment temperature may be a temperature higher than the carbonization temperature.

Specifically, for example, when the carbonization temperature is 400° C. or more and 1,100° C. or less, the heat treatment temperature may be a temperature that is 300° C. or more and 1,000° C. or less, and is equal to or lower than the carbonization temperature or is lower than the carbonization temperature.

A rate of temperature increase upon heating of the carbonized material to the heat treatment temperature and the time period for which the carbonized material is held at the heat treatment temperature (heat treatment time) may be the same as those in the case of the carbonization. The heat treatment is preferably performed in an inert gas such as nitrogen (e.g., in a flow of the inert gas). The metal removal treatment and the heat treatment may each be repeated twice or more. The Catalyst may also be a pulverized product of the carbonized material subjected to the metal removal treatment and the heat treatment.

The Catalyst may also be a carbon catalyst obtained by subjecting the carbonized material of the raw material containing the organic substance and the metal to a metal impregnation treatment and a heat treatment. That is, in this case, the Catalyst is obtained by: subjecting the carbonized material, which is obtained by carbonizing the raw material containing the organic substance and the metal, to the metal impregnation treatment; and subjecting the resultant to the heat treatment.

The metal impregnation treatment is a treatment for impregnating the carbonized material obtained by the carbonization of the raw material as described above with a metal. The metal with which the carbonized material is impregnated is not particularly limited as long as the metal does not inhibit the activity of the Catalyst, and one or two or more kinds of arbitrary metals may be used.

The metal may be, for example, one or two or more kinds selected from the group consisting of Groups 3 to 16 of the periodic table. In addition, for example, a transition metal (belonging to Groups 3 to 12 of the periodic table) may be preferably used as the metal. Further, a metal belonging to the fourth period, fifth period, or sixth period of Groups 3 to 12 of the periodic table may be preferably used as the transition metal.

Specifically, for example, there may be preferably used one or two or more kinds selected from the group consisting of titanium, chromium, manganese, iron, cobalt, nickel, copper, zinc, zirconium, niobium, molybdenum, ruthenium, lanthanum, cerium, and tantalum, and there may be more preferably used one or two or more kinds selected from the group consisting of titanium, iron, zirconium, ruthenium, and cerium.

In addition, in the metal impregnation treatment, the carbonization material may be impregnated with another kind of metal different from the metal in the raw material used in the carbonization describe above. That is, for example, the carbonization material may be impregnated with one or two or more kinds different from the metal in the raw material and selected from the group consisting of aluminum, silicon, titanium, chromium, manganese, iron, cobalt, nickel, copper, zinc, gallium, zirconium, niobium, molybdenum, ruthenium, indium, tin, lanthanum, cerium, tantalum, and lead or the group consisting of titanium, iron, zirconium, ruthenium, and cerium.

The metal may be used as a simple substance of the metal or as a compound of the metal. As the metal compound, there may be used, for example, a metal salt, a metal oxide, a metal hydroxide, a metal nitride, a metal sulfide, a metal carbide, or a metal complex. Of those, a metal salt, a metal oxide, a metal sulfide, or a metal complex may be preferably used.

A method of impregnating the carbonized material with the metal is not particularly limited as long as at least the surface of the carbonized material is impregnated with the metal, and for example, a method involving bringing the carbonized material into contact with a solution containing the metal may be employed.

That is, the carbonized material may be impregnated with the metal by, for example, immersing and maintaining the carbonized material in a metal-containing solution. In this case, the carbonized material may also be maintained in the metal-containing solution that is boiling. In addition, an acidic solution may be used as the metal-containing solution. In this case, the pH of the metal-containing solution may be, for example, 1 or more and 6 or less.

The subsequent heat treatment is performed by maintaining the carbonized material impregnated with the metal as described above at a predetermined temperature. The heat treatment after the metal impregnation treatment may be performed in the same manner as in the heat treatment after the metal removal treatment. The metal impregnation treatment and the heat treatment may each be repeated twice or more. The Catalyst may also be a pulverized product of the carbonized material subjected to the metal impregnation treatment and the heat treatment.

A hazardous-substance-decomposing material according to this embodiment (hereinafter referred to as "the Decomposing Material") is a material containing such a carbon catalyst for decomposing a hazardous substance as described above (the Catalyst). That is, the Decomposing Material contains the Catalyst as a catalyst for decomposing a hazardous substance.

The Decomposing Material contains, for example, a carrier, and the Catalyst carried by the carrier. That is, the Decomposing Material may contain, for example, a resin carrier, and the Catalyst carried on the surface of the resin carrier and in the inside thereof. Alternatively, the Decomposing Material may contain, for example, a fiber carrier, and the Catalyst carried on the surface of the fiber carrier and in the inside thereof. In any such case, the Decomposing Material may be produced by, for example, causing the Catalyst to adhere to the resin carrier or the fiber carrier through fusion at a temperature around the melting point of a resin constituting the resin carrier or of fibers constituting the fiber carrier. Alternatively, the Decomposing Material may be produced by incorporating the Catalyst into the fibers upon weaving of the fibers at the time of the production of the fiber carrier. It should be noted that for example, an organic fiber carrier such as a paper, cotton, or resin fiber carrier, may be used as the fiber carrier, and an inorganic fiber carrier may also be used.

Alternatively, the Decomposing Material may be, for example, a molded body of the mixture of a resin and the Catalyst. In this case, for example, the following is adopted. The resin is melted or dissolved in a solvent. Next, the Catalyst is dispersed in the resin. After that, the resultant mixture is molded into a predetermined shape so that the Decomposing Material is obtained as a molded body of the mixture.

Alternatively, the Decomposing Material may contain, for example, an inorganic material carrier and the Catalyst carried by the inorganic material carrier. In this case, a method of causing the inorganic material carrier to carry the Catalyst is not particularly limited, and the Decomposing Material may be produced by, for example, fusion by a resin, a surface treatment, or hybridization. Alternatively, the Decomposing Material may contain, for example, a filter (such as a honeycomb-like filter) and the Catalyst loaded into the filter.

Alternatively, the Decomposing Material may be, for example, a molded body of the mixture of an inorganic material and the Catalyst. In this case, for example, the following is adopted. A mixture which contains the inorganic material and the Catalyst or a precursor of the Catalyst, and to which a binder is added as required, is preliminarily molded, and then the resultant preliminary molded body is calcined so that the Decomposing Material may be obtained as a sintered body containing the inorganic material and the Catalyst. For example, ceramic such as alumina or cordierite, a tile, or glass may be used as such inorganic material. In addition, a metal may be used as a carrier.

When the Decomposing Material is a molded body, the shape of the molded body is not particularly limited. For example, the Decomposing Material may be formed into a fiber shape, a rod shape, a film shape, a sheet shape, a net shape, a honeycomb shape, a pleated shape, a corrugated shape, a corrugated honeycomb shape, a cotton shape, a wool shape, a plate shape, a block shape, a columnar shape, a polygonal columnar shape, a grain shape, a pellet shape, a powder shape, a hollow body, a foam body, or a porous structure. Further, the Decomposing Material may also be formed into, for example, a powder, a slurry, a coating material, a cake, paper, a woven fabric, a knitted fabric, a non-woven fabric, a filter, a coating sheet, a multilayer body, a gel, an ion gel, or an ionic liquid gel.

A method of decomposing a hazardous substance according to this embodiment (hereinafter referred to as "the Method") is a method including decomposing the hazardous substance with such a carbon catalyst for decomposing a hazardous substance (the Catalyst) or hazardous-substance-decomposing material (the Decomposing Material) as described above.

That is, in the Method, for example, the Catalyst or the Decomposing Material is brought into contact with a fluid (a gas or a liquid) containing a hazardous substance to be removed. Specifically, in the Method, for example, the Catalyst or the Decomposing Material is brought into contact with a gas containing a VOC or a gas containing a sulfur compound. As described above, examples of the VOC include one or two or more kinds selected from the group consisting of aldehydes such as formaldehyde, acetaldehyde, and nonenal; carboxylic acids such as formic acid, acetic acid, and isovaleric acid; aromatic hydrocarbons such as toluene, xylene, phenol, styrene, and benzene; ammonia; and amines such as trimethylamine. In addition, as described above, examples of the sulfur compound include one or two or more kinds selected from the group consisting of hydrogen sulfide, methyl sulfide, methyl disulfide, methylmercaptan, and ethylmercaptan.

Alternatively, in the Method, for example, the Catalyst or the Decomposing Material is brought into contact with a liquid containing a hazardous substance. Examples of such liquid include an aqueous solution containing formaldehyde (formalin) and an aqueous solution containing ozone. Therefore, the Catalyst or the Decomposing Material may be used as, for example, a water-purifying material. It should be noted that the solvent is not limited to water as long as the solvent dissolves the hazardous substance.

According to the Catalyst, the Decomposing Material, and the Method as described above, hazardous substances such as aldehydes are effectively decomposed. That is, the Catalyst itself decomposes the hazardous substances such as aldehydes alone without being combined with a noble metal catalyst such as platinum. Therefore, the Catalyst and the Decomposing Material each have high general-purpose property as an inexpensive catalyst for decomposing a hazardous substance or hazardous-substance-decomposing material.

In addition, while conventional activated carbon has required an activating treatment, the Catalyst is produced without the performance of such activating treatment. Further, the Catalyst may be repeatedly used without the performance of any regenerating treatment because the Catalyst removes hazardous substances such as aldehydes not through adsorption but through decomposition.

In addition, a photocatalyst needs to be irradiated with light in order for the photocatalyst to exhibit its catalytic activity. However, the decomposition of a hazardous substance by the Catalyst does not require such light irradiation. That is, the Catalyst effectively decomposes hazardous substances such as aldehydes by virtue of its carbon structure itself, even in an environment where no light source exists (e.g., under light shielding).

It should be noted that applications of the Catalyst or the Decomposing Material are exemplified by an air cleaning device (e.g., an air cleaning device to be installed in an automobile, a tunnel, a sterile room, a store room, or a bathroom), an air cleaning filter, an automobile care sheet (for odor elimination before delivery, a floor mat, or the like), an exhaust (e.g. formaldehyde or acetaldehyde) purification device for an automobile, an exhaust purification device for a fuel battery, a care sheet for painter's work, a tobacco odor removing filter, a mask, a wall material, wallpaper, a ceiling material, a floor material, furniture, a self-cleaning material, an article for daily use, a sponge, slippers, a towel, a fan filter, a kerosene stove, a gas stove, a sensor, a refrigerator, a veneer, a catalytic combustion device, a protective cover for a seat, a tape, an ozone removing device, a dehumidifier, a plant fiber board, a rubber composition, an image forming device such as a copier (e.g. removal of a VOC emitted from toner), an information processing device such as a computer, a filter material, a gas mask, a packaging material, a garbage disposer, a tile, clothes, an electric dust collector, sanitary ware, a rice cooker, a hair cap, decomposition of an aldehyde in water, a water purification device (BOD, COD), a gas decomposition electrode, a soil modifier, a paint, a deodorant spray, a hair spray, an article for daily use for an infant, a coating material, a dye, coloring component removal, impurity removal, unreacted substance (chemical substance, ionic liquid, or the like) removal, purification of the inside of a furnace, offset printing, gravure printing, a coater, metal printing (can production/coil coating), a coating drying process, an enamel electric wire-baking furnace, a colored steel plate, a recombiner for nuclear energy, sewage water treatment, organic gas treatment, water treatment (water and sewerage, pool, ozone water production apparatus, or the like), surface treatment (e.g. liquid crystal, semiconductor, plastic film, or metal), sterilization (food, medicine, medical equipment, karaoke microphone, or the like), a vacuum cleaner, a pet house, a blind, a soil modifier, an air battery, and a PCB decomposing agent.

In addition, sites for the utilization of the Catalyst or the Decomposing Material are exemplified by an indoor site, the inside of an automobile, the inside of an exhaust gas line from an internal combustion engine, transportation equipment, analytical equipment, a ship, an airplane, a railway car, a facility construction site, a petrochemical plant, a chemical industrial plant, a food industrial plant, a hydrogen production reformer, a roof, an exterior wall, a tunnel, soil, sea water, clean water, and sewage water. Next, a specific example according to this embodiment is described.

EXAMPLE 1

Carbon Catalyst 1 (PCo)

1.5 Grams of a polyacrylonitrile-polymethacrylic acid copolymer (PAN/PMA) were dissolved in 30 mL of dimethylformamide. After that, 1.5 g of 2-methylirnidazole and 1.5 g of cobalt chloride hexahydrate ($CoCl_2.6H_2O$) (manufactured by KANTO CHEMICAL CO., INC.) were further added to the solution, and then the mixture was stirred at room temperature for 2 hours. Ketjen black (ECP600LTD manufactured by Lion Corporation) was added to the mixture thus obtained so as to account for 30 wt % of the solid content to be incorporated into a raw material, and then the contents were mixed with a mortar. The resultant mixture was vacuum-dried at 60° C. for 12 hours.

Further, the mixture was heated in the atmosphere so that its temperature was increased from room temperature to 150° C. in 30 minutes. Subsequently, the temperature was increased from 150° C. to 220° C. over 2 hours. After that, the mixture was held at 220° C. for 3 hours so that the mixture was made infusible. Thus, the raw material for a carbonized material was prepared.

Next, the carbonization of the raw material was performed. That is, the raw material subjected to the infusible treatment as described above was loaded into a quartz tube and subjected to nitrogen purge in an image furnace for 20 minutes, and then its temperature was increased from room temperature to 900° C. by heating over 18 minutes. After that, the raw material was held at 900° C. for 1 hour. Thus, a carbonized material was obtained.

Further, the carbonized material was pulverized. That zirconia balls each having a diameter of 10 mm were set in a planetary ball mill (P-7 manufactured by FRITSCH JAPAN CO., LTD.), and then a treatment for pulverizing the carbonized material with the planetary ball mill for 5 minutes at a rotational speed of 650 rpm was performed 10 cycles. After that, the pulverized carbonized material was taken out and passed through a sieve having an aperture of 106 μm. The carbonized material that had passed the sieve was obtained as a pulverized, fine particulate carbon catalyst 1 (PCo).

Carbon Catalyst 2 (PCoAW)

First, the carbon catalyst 1 (PCo) obtained as described above was subjected to a metal removal treatment (acid treatment). That is, 100 mL of concentrated hydrochloric acid were added to 1 g of the carbon catalyst 1 (PCo), and then the mixture was stirred for 1 hour. Next, the carbon catalyst was precipitated, and then the solution was removed. After that, 100 mL of a solution prepared by mixing concentrated hydrochloric acid and distilled water at 1:1 (volume ratio) were added to the carbon catalyst, and then the mixture was stirred for 1 hour. The carbon catalyst was precipitated, and then the solution was removed. After that, 100 mL, of distilled water were added to the carbon catalyst, and then the mixture was stirred for 1 hour. The solution containing the carbon catalyst was filtrated with a filtration film (having a pore diameter of 1.0 μm and manufactured by Millipore), and then the filtrate was cleaned with distilled water until the filtrate became neutral. The recovered carbon catalyst was vacuum-dried at 60° C. for 12 hours. Further, the dried carbon catalyst was pulverized with a mortar.

Next, a heat treatment was performed. That is, the carbon catalyst subjected to the metal removal treatment as described above was loaded into a quartz tube and subjected to nitrogen purge in an image furnace for 20 minutes, and then its temperature was increased from room temperature to 700° C. by heating over 14 minutes. After that, the carbon catalyst was held at 700° C. for 1 hour.

Further, the carbon catalyst after the heat treatment was pulverized. That is, zirconia balls each having a diameter of 10 mm were set in a planetary ball mill, and then a treatment for pulverizing the carbon catalyst in the planetary ball mill for 5 minutes at a rotational speed of 450 rpm was performed over 4 cycles. After that, the pulverized carbon catalyst was taken out and passed through a sieve having an aperture of 106 μm. The carbon catalyst that had passed the sieve was obtained as a pulverized, fine particulate carbon catalyst 2 (PCoAW).

Carbon Catalyst 3 (PCoFeAW)

First, the carbon catalyst 1 (PCo) obtained as described above was subjected to a metal impregnation treatment. That is, an iron-containing solution was prepared by adding 2 g of iron (III) chloride hexahydrate ($FeCl_3.6H_2O$) to 300 mL of distilled water, 2 g of the carbon catalyst 1 (PCo) were added to the iron-containing solution, and the iron-containing solution was boiled. Then, the carbon catalyst was impregnated with iron for 3 hours while being stirred in the iron-containing solution that was boiling. After that, the solution containing the carbon catalyst was filtrated with a filtration film (having a pore diameter of 1.0 μm and manufactured by Millipore), and then the filtrate was cleaned with distilled water until the filtrate became neutral. The recovered carbon catalyst was vacuum-dried at 60° C. for 12 hours. Further, the dried carbon catalyst was pulverized with a mortar.

Next, a heat treatment was performed. That is, the carbon catalyst subjected to the metal impregnation treatment as described above was loaded into a quartz tube and subjected to nitrogen purge in an image furnace for 20 minutes, and then its temperature was increased from room temperature to 700° C. by heating over 14 minutes. After that, the carbon catalyst was held at 700° C. for 1 hour.

Further, the carbon catalyst after the heat treatment was pulverized. That is, zirconia balls each having a diameter of 10 mm were set in a planetary ball mill, and then a treatment for pulverizing the carbon catalyst in the planetary ball mill for 5 minutes at a rotational speed of 450 rpm was performed over 4 cycles. After that, the pulverized carbon catalyst was taken out and passed through a sieve having an aperture of 106 μm. The carbon catalyst that had passed the sieve was obtained as a pulverized, fine particulate carbon catalyst (PCoFe).

Further, the carbon catalyst (PCoFe) thus obtained was subjected to a metal removal treatment (acid treatment). That is, 100 mL of concentrated hydrochloric acid were added to 1 g of the carbon catalyst (PCoFe), and then the mixture was stirred for 1 hour. Next, the carbon catalyst was precipitated, and then the solution was removed. After that, 100 mL of a solution prepared by mixing concentrated hydrochloric acid and distilled water at 1:1 (volume ratio) were added to the carbon catalyst, and then the mixture was stirred for 1 hour. The carbon catalyst was precipitated, and then the solution was removed. After that, 100 mL of distilled water were added to the carbon catalyst, and then the mixture was stirred for 1 hour. The solution containing the carbon catalyst was filtrated with a filtration film (having a pore diameter of 1.0 μm and manufactured by Millipore), and then the filtrate was cleaned with distilled water until the filtrate became neutral. The recovered carbon catalyst was vacuum-dried at 60° C. for 12 hours. Further, the dried carbon catalyst was pulverized with a mortar.

Next, a heat treatment was performed. That is, the carbon catalyst subjected to the metal removal treatment as described above was loaded into a quartz tube and subjected to nitrogen purge in an image furnace for 20 minutes, and then its temperature was increased from room temperature to 700° C. by heating over 14 minutes. After that, the carbon catalyst was held at 700° C. for 1 hour.

Further, the carbon catalyst after the heat treatment was pulverized. That is, zirconia balls each having a diameter of 10 mm were set in a planetary ball mill, and then a treatment for pulverizing the carbon catalyst in the planetary ball mill for 5 minutes at a rotational speed of 450 rpm was performed over 4 cycles. After that, the pulverized carbon catalyst was taken out and passed through a sieve having an aperture of 106 μm. The carbon catalyst that had passed the sieve was obtained as a pulverized, fine particulate carbon catalyst 3 (PCoFeAW).

Carbon Catalyst 4 (CFCo)

1 Gram of a coffee ground powder (San Yuki Kenkyusho Y. K.) 1 g of succinic acid dihydrazide (manufactured by JAPAN FINECHEM COMPANY, INC.), and 1 g of cobalt chloride hexahydrate ($CoCl_2 \cdot 6H_2O$) were mixed and dissolved in 10 mL, of distilled water, and then the resultant solution was dried at 100° C. for 12 hours. Further, the raw material obtained by the drying was pulverized with a mortar.

Next, the carbonization of the raw material was performed. That is, the raw material obtained as described above was loaded into a quartz tube and subjected to nitrogen purge in an image furnace for 20 minutes, and then its temperature was increased from room temperature to 900° C. by heating over 90 minutes. After that, the raw material was held at 900° C. for 1 hour. Thus, a carbonized material was obtained.

Further, the carbonized material was pulverized with a mortar. After that, the pulverized carbonized material was taken out and passed through a sieve having an aperture of 106 μm. The carbonized material that had passed the sieve was obtained as a pulverized, fine particulate carbon catalyst 4 (CFCo).

Carbon Catalyst 5 (AGBCo)

5 Grams of a graphite AG.B (manufactured by Ito Kokuen Co., Ltd.), 5 g of succinic acid dihydrazide (manufactured by JAPAN FINECHEM COMPANY, INC.), and 5 g of cobalt chloride hexahydrate ($CoCl_2 \cdot 6H_2O$) were mixed and dissolved in 50 mL of distilled water, and then the solution thus obtained was dried at 100° C. for 12 hours. Further, the dried product was pulverized with a mortar. Thus, a raw material was obtained.

Next, the raw material obtained as described above was loaded into a quartz tube and subjected to nitrogen purge in a tubular furnace for 20 minutes, and then its temperature was increased from room temperature to 900° C. in a nitrogen atmosphere by heating over 90 minutes. After that, the raw material was held at 900° C. for 1 hour. Thus, the carbonization of the raw material was performed.

Further, the carbonized material thus obtained was pulverized with a mortar. After that, the pulverized carbonized material was taken out and passed through a sieve having an aperture of 106 μm. After that, the carbonized material that had passed the sieve was obtained as a pulverized, fine particulate carbon catalyst 5 (AGBCo).

Carbon Catalyst 6 (AASCo)

1 Gram of a graphite AG.B (manufactured by Ito Kokuen Co., Ltd.), 5 g of a 20-wt % polyacrylamide-based paper strength agent (manufactured by SEIKO PMC CORPORATION), and 1 g of cobalt sulfate heptahydrate ($CoSO_4 \cdot 7H_2O$) were mixed, and then the resultant viscous solution was dried at 80° C. for 12 hours.

Next, the carbonization of the raw material was performed. That is, the raw material obtained as described above was loaded into a quartz tube and subjected to nitrogen purge in an image furnace for 20 minutes, and then its temperature was increased from room temperature to 900° C. by heating over 90 minutes. After that, the raw material was held at 900° C. for 1 hour. Thus, a carbonized material was obtained.

Further, the carbonized material was pulverized with a mortar. After that, the pulverized carbonized material was taken out and passed through a sieve having an aperture of 106 μm. The carbonized material that had passed the sieve was obtained as a pulverized, fine particulate carbon catalyst 6 (AASCo).

Alumina/Carbon Catalyst (A/PCo)

2.5 Grams of the carbon catalyst 1 (PCo) obtained as described above, 2.5 g of α-alumina ($\alpha\text{-}Al_2O_3$, manufactured by Wako Pure Chemical Industries, Ltd.), 0.40 g of a binder (48% water dispersion of a styrene-butadiene rubber (SBR), manufactured by JSR Corporation), 4.48 g of a thickener (2% aqueous solution of carboxymethylcellulose (CMC), manufactured by Daicel Chemical Industries, Ltd.), and 1 g of distilled water were mixed with a mortar. The resultant mixture was dried at 100° C. and molded into a block shape.

Next, the carbonization of the block-like molded product was performed. That is, the molded product obtained as described above was loaded into a quartz tube and subjected to nitrogen purge in an image furnace for 20 minutes, and then its temperature was increased from room temperature to 900° C. by heating over 90 minutes. After that, the molded product was held at 900° C. for 1 hour. Thus, a block-like sintered body (composite of alumina and the carbon catalyst 1) was obtained as an alumina/carbon catalyst (A/PCo)

Aldehyde Decomposition Test

The decomposition test of formaldehyde was performed with any one of the carbon catalysts 1 to 6 and the alumina/carbon catalyst obtained as described above. That is, 100 mg of any one of the carbon catalysts 1 to 6 or 200 mg of the alumina/carbon catalyst were stored in a Tedlar bag at 25° C., and at the same time, 5 L of air containing formaldehyde at a concentration of 1,000 ppm were injected into the Tedlar bag. After 24 hours, the concentration of formaldehyde in the Tedlar bag and the concentration of carbon dioxide generated by the decomposition of the formaldehyde were measured. The concentration of formaldehyde was measured with a detecting tube for formaldehyde (manufactured by GASTEC CORPORATION). The concentration of carbon dioxide was measured with a gas chromatograph (GC-2014 manufactured by Shimadzu Corporation) and obtained as a value as a result of the subtraction of the concentration of carbon dioxide in the atmosphere (outside the Tedlar bag) from the measured value.

Then, a formaldehyde decomposition ratio (%) was determined from the following equation: formaldehyde decomposition ratio (%)=(carbon dioxide concentration after 24 hours (ppm)/initial formaldehyde concentration (ppm))×100. In addition, a formaldehyde disappearance ratio (%) was determined from the following equation: formaldehyde disappearance ratio (%)=((initial formaldehyde concentration (ppm)−formaldehyde concentration after 24 hours (ppm))/initial formaldehyde concentration (ppm))×100. Further, a formaldehyde adsorption ratio (%) was determined from the following equation: formaldehyde adsorption ratio (%)=formaldehyde disappearance ratio (%)−formaldehyde decomposition ratio (%).

In addition, the decomposition test of formaldehyde was similarly performed with 100 mg of high-specific surface area activated carbon (MSC30 manufactured by Kansai Coke and Chemicals Co., Ltd.) as a comparative material 1 (AC) or with 100 mg of cobalt oxide (CoO manufactured by C.I. Kasei Company, Limited) as a comparative material 2 (CoO) instead of a carbon catalyst.

It should be noted that as a result of the measurement of the weights of the carbon catalyst 1 (PCo), the carbon catalyst 2 (PCoAW), the carbon catalyst 3 (PCoFeAW), the carbon catalyst 4 (CFC0), the carbon catalyst 5 (AGBCo), the carbon catalyst 6 (AASCo), and the alumina/carbon catalyst (A/PCo) before and after the decomposition test, none of the carbon catalysts and the alumina/carbon catalyst showed a weight change.

Figure 1:
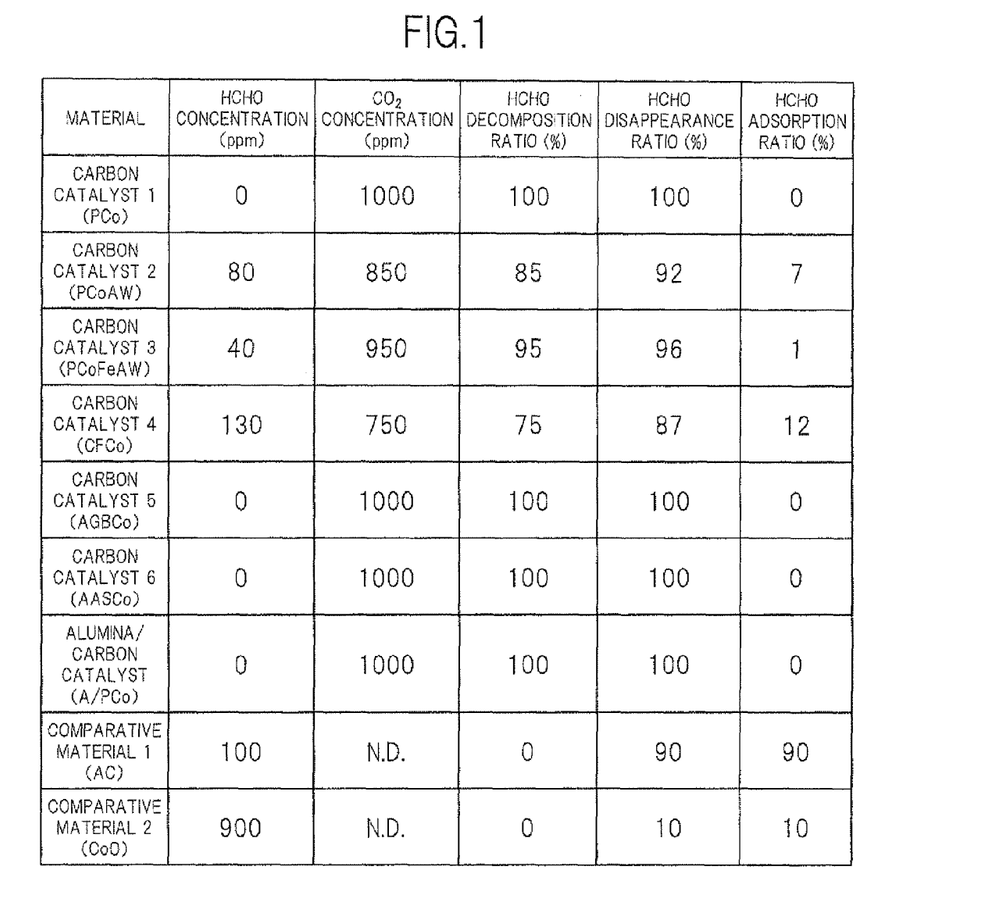
FIG. 1 is an explanatory diagram illustrating an example of a result of an aldehyde decomposition test in an embodiment of the present invention.

FIG. 1 illustrates the results of the aldehyde decomposition test. FIG. 1 illustrates the formaldehyde (HCHO) concentration (ppm), carbon dioxide ($CO_2$) concentration (ppm), formaldehyde decomposition ratio (%), formaldehyde disappearance ratio (%), and formaldehyde adsorption ratio (%) after 24 hours of each of the carbon catalysts 1 to 6, the alumina/carbon catalyst (A/PCo), and the comparative materials 1 and 2.

As illustrated in FIG. 1, the carbon catalysts 1 to 6 and the alumina/carbon catalyst each had a formaldehyde decomposition ratio of 75 to 100%. That is, it was confirmed that the carbon catalysts 1 to 6 and the alumina/carbon catalyst each had an excellent aldehyde-decomposing activity. It should be noted that the carbon catalysts 1 to 6 and the alumina/carbon catalyst each had a formaldehyde adsorption ratio as low as 0 to 12%.

In addition, the carbon catalyst 2 (PCoAW) and the carbon catalyst 3 (PCoFeAW) each subjected to the metal removal treatment (acid treatment) also exhibited high aldehyde decomposition ratios. Therefore, the aldehyde-decomposing activity of each of the carbon catalysts 1 to 6 and the alumina/carbon catalyst was considered to be the activity of its own carbon structure.

On the other hand, formaldehyde was not decomposed when each of the comparative material 1 (AC) and the comparative material 2 (CoO) was used (The term "N.D." in FIG. 1 means "not detected."). Although a high formaldehyde disappearance ratio was obtained when the comparative material 1 (AC) as activated carbon was used, this was attributable to the adsorption of formaldehyde by the activated carbon as indicated by the high formaldehyde adsorption ratio. In addition, when the comparative material 2 (CoO) formed of cobalt oxide was used, almost no formaldehyde was removed.

EXAMPLE 2

Aldehyde Decomposition Repetition Test

The carbon catalyst 1 (PCo) and the comparative material 1 (AC) used in the aldehyde decomposition test in the Example 1 were each evaluated for its aldehyde-decomposing (removing) ability in repeated use.

That is, the same aldehyde decomposition test as that in the Example 1 was repeatedly performed with each of the carbon catalyst 1 (PCo) and the comparative material 1 (AC). Specifically, first, air containing formaldehyde at a concentration of 1,000 ppm was injected into a Tedlar bag storing the carbon catalyst 1 (PCo) or the comparative material 1 (AC), and then the concentrations of formaldehyde and carbon dioxide after 24 hours were measured. After that, the gases in the Tedlar bag were removed. Then, air containing formaldehyde at a concentration of 1,000 ppm was injected into the Tedlar bag again without the performance of any regenerating treatment for the carbon catalyst 1 (PCo) and the comparative material 1 (AC), and then the concentrations of formaldehyde and carbon dioxide after 24 hours were measured. After that, the gases in the Tedlar bag were removed. Such test cycle was repeated without the performance of any regenerating treatment for the carbon catalyst 1 (PCo) and the comparative material 1 (AC).

Figure 2:
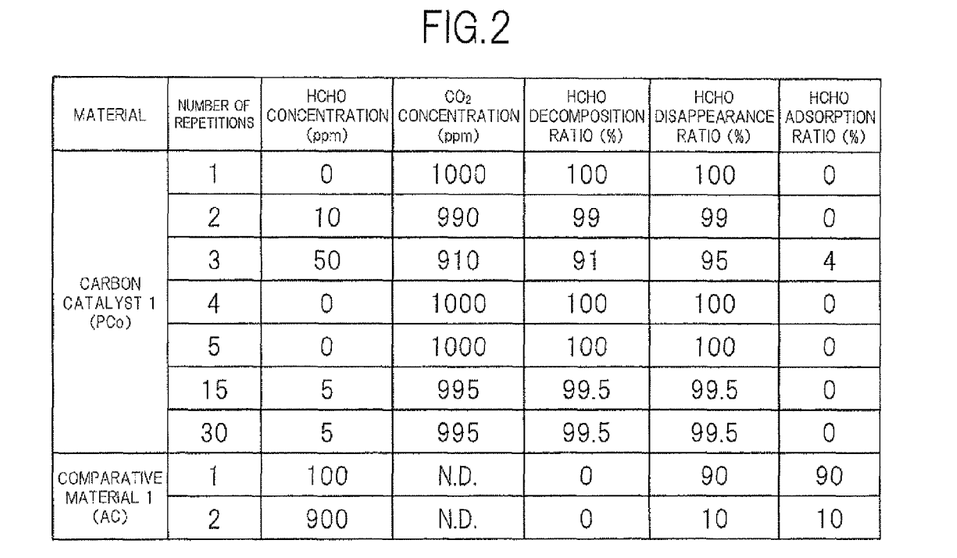
FIG. 2 is an explanatory diagram illustrating an example of a result of an aldehyde decomposition repetition test in the embodiment of the present invention.

FIG. 2 illustrates the results of the aldehyde decomposition repetition test. FIG. 2 illustrates the formaldehyde concentration (ppm), carbon dioxide concentration (ppm), formaldehyde decomposition ratio (%), formaldehyde disappearance ratio (%), and formaldehyde adsorption ratio (%) after 24 hours of each of the carbon catalyst 1 (PCo) and the comparative material 1 (AC) for each number of repetitions of the test.

As illustrated in FIG. 2, when the carbon catalyst 1 (PCo) was used, a formaldehyde decomposition ratio as high as 91 to 100% was obtained for a number of times of repetition of up to 30. That is, it was confirmed that the carbon catalyst 1 (PCo) was able to repeatedly decompose the aldehyde without being subjected to any regenerating treatment.

On the other hand, when the comparative material 1 (AC) as activated carbon was used, the formaldehyde disappearance ratio in the first test was 90%, but the formaldehyde disappearance ratio in the second test significantly reduced to 10%. That is, when the comparative material 1 (AC) was used, the aldehyde could not be repeatedly removed without the performance of any regenerating treatment.

EXAMPLE 3

Aldehyde Decomposition Test Under Light Shielding

The aldehyde-decomposing activity of the carbon catalyst 1 (PCo) obtained in the Example 1 was compared with that of a photocatalyst. That is, 30 mg of the carbon catalyst 1 (PCo) were stored in a Tedlar bag at 25° C. and shielded from light with a light-shielding box. After that, air containing formaldehyde was injected into the Tedlar bag, and then the formaldehyde concentration in the Tedlar bag was regulated to 40 ppm.

After that, the gases in the Tedlar bag were sampled every predetermined time period, and then the formaldehyde concentration in the sampled gases was measured with a detecting tube for formaldehyde (manufactured by GASTEC CORPORATION).

Then, a formaldehyde residual ratio (%) was determined from the following equation: formaldehyde residual ratio (%)=(formaldehyde concentration at each sampling time (ppm)/initial formaldehyde concentration (ppm))×100.

In addition, the decomposition test of formaldehyde was similarly performed under light shielding with 30 mg of a photocatalyst (TP-S201 manufactured by Sumitomo Chemical Company, Limited) instead of the carbon catalyst 1 (PCo). In addition, the same formaldehyde decomposition test was performed with 30 mg of the photocatalyst instead of the carbon catalyst under irradiation with ultraviolet light (UV). It should be noted that the UV irradiation was performed with a black light by irradiating the photocatalyst with UV at an intensity of 0.1 mW/cm$^2$.

Figure 3:
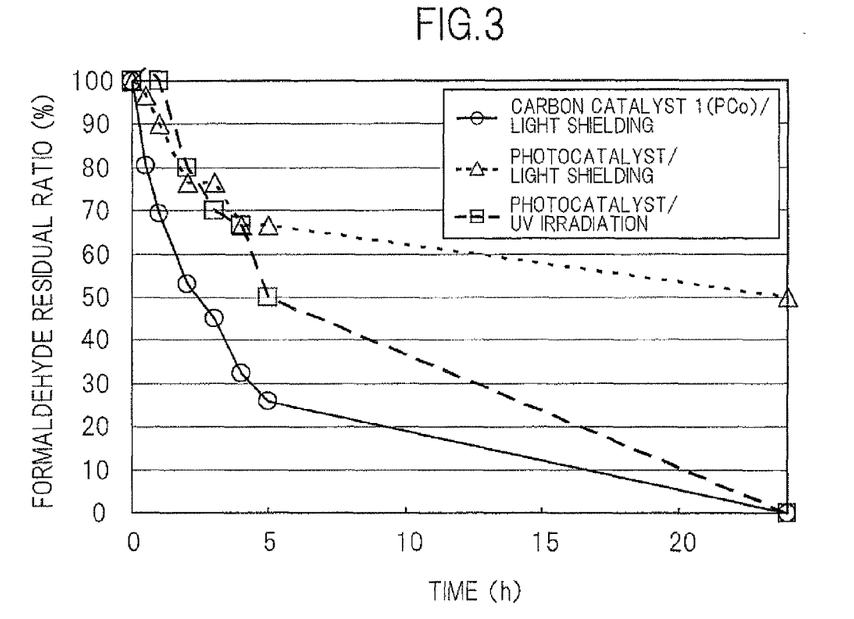
FIG. 3 is an explanatory diagram illustrating an example of a result of an aldehyde decomposition test under light shielding in the embodiment of the present invention.

FIG. 3 illustrates the results of the aldehyde decomposition test. In FIG. 3, the axis of abscissa indicates a time (h) from the initiation of the test and the axis of ordinate indicates the formaldehyde residual ratio (%). In addition, circles represent the results in the case where the carbon catalyst 1 (PCo) was used under light shielding, triangles represent the results in the case where the photocatalyst was used under light shielding, and squares represent the results in the case where the photocatalyst was used under the UV irradiation.

As illustrated in FIG. 3, while the photocatalyst under light shielding could not sufficiently remove formaldehyde, complete removal of formaldehyde within 24 hours was achieved when each of the carbon catalyst 1 (PCo) under light shielding and the photocatalyst under the UV irradiation was used.

Further, the aldehyde decomposition rate of the carbon catalyst 1 (PCo) under light shielding was larger than that of the photo catalyst under the UV irradiation. That is, it was confirmed that the carbon catalyst 1 (PCo) had an excellent aldehyde-decomposing activity compared even with that of the photocatalyst.

EXAMPLE 4

Sulfur Compound Decomposition Repetition Test

The carbon catalyst 1 (PCo) and the comparative material 1 (AC) used in the aldehyde decomposition test in the Example 1 were each evaluated for its hydrogen sulfide-decomposing (removing) ability in repeated use.

That is, the repetition test of hydrogen sulfide decomposition was performed in the same manner as in the Example 2 involving using the carbon catalyst 1 (PCo) and the comparative material 1 (AC) except that: hydrogen sulfide was used as a gas to be injected into a Tedlar bag instead of formaldehyde; and the initial concentration of hydrogen sulfide in the Tedlar bag was set to 500 ppm. The measurement of the concentration of hydrogen sulfide was performed by: sampling the gases in the Tedlar bag every predetermined time period; and measuring the hydrogen sulfide concentration in the sampled gases with a detecting tube for hydrogen sulfide (manufactured by GASTEC CORPORATION).

Figure 4:
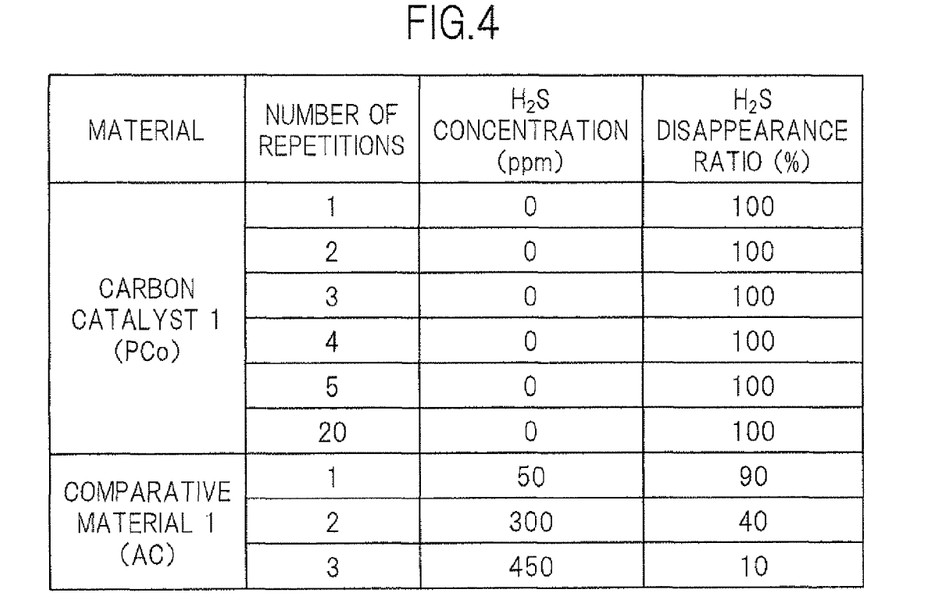
FIG. 4 is an explanatory diagram illustrating an example of a result of a sulfur compound decomposition test in the embodiment of the present invention.

FIG. 4 illustrates the results of the sulfur compound decomposition repetition test. FIG. 4 illustrates the hydrogen sulfide ($H_2S$) concentration (ppm) and the hydrogen sulfide disappearance ratio (%) after 24 hours of each of the carbon catalyst (PCo) and the comparative material 1 (AC) for each number of repetitions of the test.

It should be noted that a hydrogen sulfide disappearance ratio (%) was determined from the following equation: hydrogen sulfide disappearance ratio (%)=((initial hydrogen sulfide concentration (ppm)−hydrogen sulfide concentration after 24 hours (ppm))/initial hydrogen sulfide concentration (ppm))×100.

As illustrated in FIG. 4, when the carbon catalyst 1 (PCo) was used, a hydrogen sulfide disappearance ratio of 100% was obtained in all cases for a number of repetitions of up to 20. That is, it was confirmed that the carbon catalyst 1 (PCo) was able to repeatedly decompose the hydrogen sulfide without being subjected to any regenerating treatment.

On the other hand, when the comparative material 1 (AC) as activated carbon was used, the hydrogen sulfide disappearance ratio in the first test was 90%, but the hydrogen sulfide disappearance ratios in the second and third tests sequentially reduced to 40% and 10%, respectively. That is, when the comparative material 1 (AC) was used, hydrogen sulfide could not be repeatedly removed to a sufficient extent without the performance of any regenerating treatment.

EXAMPLE 5

Formalin Decomposition Test 0.05 Gram of the carbon catalyst 1 (PCo) obtained in the Example 1 was loaded into 1 mL of official formalin (aqueous solution of formaldehyde) (manufactured by Wako Pure Chemical Industries, Ltd.) diluted with distilled water tenfold, and then the mixture was stirred at room temperature for 24 hours.

Then, the tenfold-diluted formalin after having been treated with the carbon catalyst 1 as described above, and the tenfold-diluted formalin subjected to no treatment, were analyzed with a high performance liquid chromatography (HPLC) analyzer (2695 separation module manufactured by Waters). The HPLC analyzer included an HPLC column (Atlantis T3 column, 5 μm, 4.6×150 mm, manufactured by Waters) and a detector (2414 RI manufactured by Waters). The injection amount of a sample was set to 10 μL, water was used as a mobile phase, and its flow rate was set to 1 mL/min.

Figure 5:
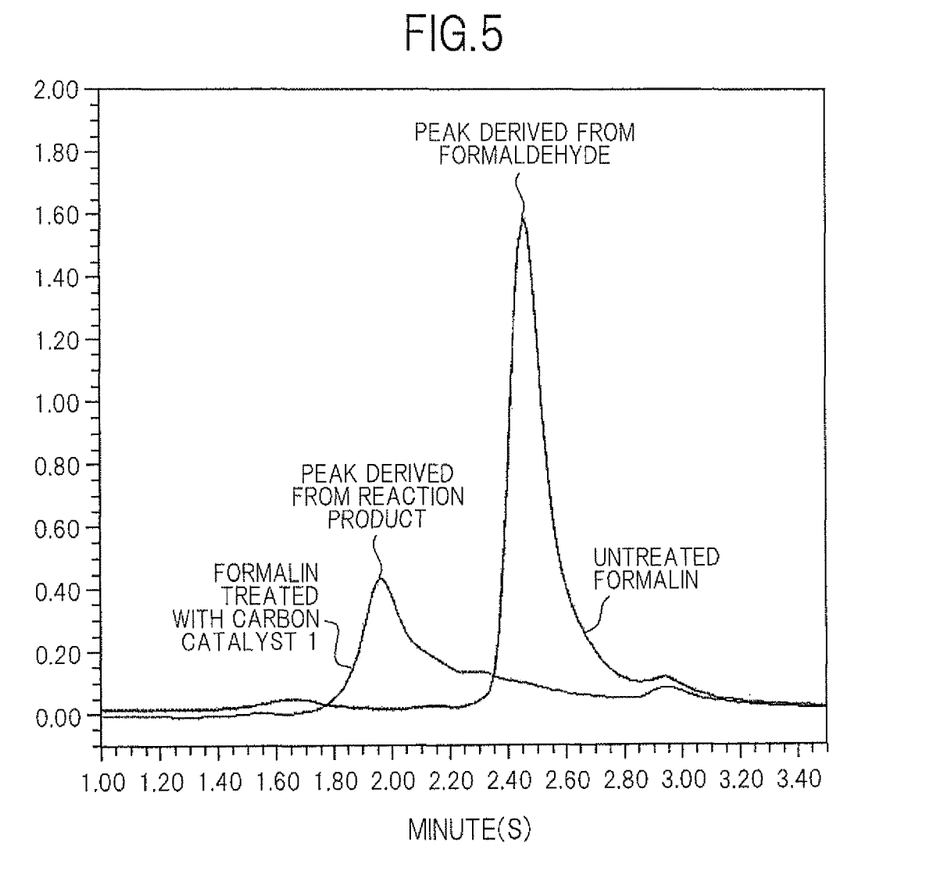
FIG. 5 is an explanatory diagram illustrating an example of a result of a formalin decomposition test in the embodiment of the present invention.

FIG. 5 illustrates a chromatogram obtained by the HPLC analysis. As illustrated in FIG. 5, while a large peak derived from formaldehyde was detected in the untreated formalin, the peak derived from formaldehyde disappeared and a peak considered to be derived from a reaction product newly appeared in the formalin treated with the carbon catalyst 1.

The invention claimed is:
1. A method of decomposing a hazardous substance, comprising decomposing the hazardous substance with a carbon catalyst for decomposing a hazardous substance, wherein:

the carbon catalyst comprises a carbonized material obtained by carbonization of a raw material prepared by mixing an organic substance containing nitrogen and a metal, the carbon catalyst has a catalytic activity for decomposing the hazardous substance, and the carbon catalyst comprises nitrogen.

2. The method of decomposing a hazardous substance according to claim 1, wherein the hazardous substance is a malodorous substance.

3. The method of decomposing a hazardous substance according to claim 2, wherein the malodorous substance is a sulfur compound.

4. The method of decomposing a hazardous substance according to claim 1, wherein the hazardous substance is a volatile organic compound.

5. The method of decomposing a hazardous substance according to claim 4, wherein the volatile organic compounds are aldehydes and oxides thereof.

6. The method of decomposing a hazardous substance according to claim 1, wherein the raw material further contains a carbon material.

7. The method of decomposing a hazardous substance according to claim 1, wherein the metal is a transition metal.

8. A method of decomposing a hazardous substance, comprising decomposing the hazardous substance with a hazardous-substance-decomposing material, wherein:

the hazardous-substance-decomposing material comprises a carbon catalyst for decomposing a hazardous substance, the carbon catalyst comprises a carbonized material obtained by carbonization of a raw material prepared by mixing an organic substance containing nitrogen and a metal, the carbon catalyst has a catalytic activity for decomposing the hazardous substance, and the carbon catalyst comprises nitrogen.

9. The method of decomposing a hazardous substance according to claim 8, wherein the hazardous substance is a malodorous substance.

10. The method of decomposing a hazardous substance according to claim 9, wherein the malodorous substance is a sulfur compound.

11. The method of decomposing a hazardous substance according to claim 8, wherein the raw material further contains a carbon material.

12. The method of decomposing a hazardous substance according to claim 8, wherein the metal is a transition metal.

13. The method of decomposing a hazardous substance according to claim 8, wherein the hazardous substance is a volatile organic compound.

14. The method of decomposing a hazardous substance according to claim 13, wherein the volatile organic compounds are aldehydes and oxides thereof.

\* \* \* \* \*